United States Patent
Goeppert et al.

(10) Patent No.: US 9,809,226 B2
(45) Date of Patent: Nov. 7, 2017

(54) METHOD FOR CONTROLLING A DRIVETRAIN HAVING A DUAL-CLUTCH TRANSMISSION

(71) Applicant: Schaeffler Technologies AG & Co. KG, Herzogenaurach (DE)

(72) Inventors: Georg Goeppert, Hausach (DE); Artur Schlappa, Ettlingen (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 66 days.

(21) Appl. No.: 14/916,795

(22) PCT Filed: Sep. 19, 2014

(86) PCT No.: PCT/DE2014/200483
§ 371 (c)(1),
(2) Date: Mar. 4, 2016

(87) PCT Pub. No.: WO2015/048962
PCT Pub. Date: Apr. 9, 2015

(65) Prior Publication Data
US 2016/0194005 A1    Jul. 7, 2016

(30) Foreign Application Priority Data

Oct. 4, 2013 (DE) .................. 10 2013 220 152
Jan. 21, 2014 (DE) .................. 10 2014 201 021

(51) Int. Cl.
*B60W 10/06* (2006.01)
*B60W 30/188* (2012.01)
(Continued)

(52) U.S. Cl.
CPC .......... *B60W 30/188* (2013.01); *B60W 10/02* (2013.01); *B60W 10/06* (2013.01);
(Continued)

(58) Field of Classification Search
CPC ... Y10T 477/79; B60W 30/188; B60W 10/06; B60W 10/113; B60W 10/02;
(Continued)

(56) References Cited

U.S. PATENT DOCUMENTS

| 5,445,576 A * | 8/1995 | Motamedi | B60W 30/18 477/102 |
|---|---|---|---|
| 2014/0148305 A1 * | 5/2014 | Yamazaki | B60W 10/06 477/5 |

(Continued)

FOREIGN PATENT DOCUMENTS

| DE | 102004009832 | 9/2004 |
|---|---|---|
| DE | 102005036894 | 3/2006 |

(Continued)

*Primary Examiner* — Roger Pang
(74) *Attorney, Agent, or Firm* — Simpson & Simpson, PLLC

(57) ABSTRACT

The invention relates to a method for controlling a drivetrain having an internal combustion engine controlled dependent on a load demand on a target engine torque and having a dual-clutch transmission with two sub-transmissions, each having a friction clutch positioned operatively between the internal combustion engine and a sub-transmission with a changing maximum transferable clutch torque, wherein a specified clutch torque is set along an actuation travel path by means of a clutch actuator, a clutch characteristic of the transferable clutch torque is continuously adapted over the actuation travel path, and a maximum engine torque for a sub-transmission, which is reduced in comparison to the target engine torque, is limited to the maximum clutch torque transferable by means of the friction clutch of that sub-transmission.

10 Claims, 3 Drawing Sheets

(51) Int. Cl.
*F16H 61/12* (2010.01)
*F16H 61/688* (2006.01)
*F16H 63/50* (2006.01)
*B60W 10/02* (2006.01)
*B60W 10/113* (2012.01)

(52) U.S. Cl.
CPC ........... *B60W 10/113* (2013.01); *F16H 61/12* (2013.01); *F16H 61/688* (2013.01); *F16H 63/50* (2013.01); *B60W 2510/0225* (2013.01); *B60W 2510/0657* (2013.01); *B60W 2510/0695* (2013.01); *B60W 2510/1005* (2013.01); *B60W 2520/105* (2013.01); *B60W 2710/021* (2013.01); *B60W 2710/025* (2013.01); *B60W 2710/0666* (2013.01); *B60W 2710/1005* (2013.01); *F16H 2061/124* (2013.01); *F16H 2063/508* (2013.01); *Y10T 477/79* (2015.01)

(58) Field of Classification Search
CPC . B60W 2510/0657; B60W 2510/0695; B60W 2510/0225; B60W 2710/0666; F16H 61/6888; F16H 63/50; F16H 2063/508; F16H 2061/124

USPC ........................................................ 701/101
See application file for complete search history.

(56) References Cited

U.S. PATENT DOCUMENTS

2014/0229082 A1* 8/2014 Iizuka .................... F02D 41/04
 701/54
2016/0375889 A1* 12/2016 Kim ...................... B60W 20/00
 701/22

FOREIGN PATENT DOCUMENTS

| DE | 102010052382 | 6/2011 | |
|----|---|---|---|
| DE | 102012204929 | 10/2012 | |
| DE | 102012207825 | 12/2012 | |
| EP | 2055602 A2 * | 5/2009 | ............ B60K 6/365 |
| WO | 2007/124710 | 11/2007 | |

* cited by examiner

METHOD FOR CONTROLLING A DRIVETRAIN HAVING A DUAL-CLUTCH TRANSMISSION

CROSS-REFERENCE TO RELATED APPLICATIONS

The present application is the United States National Stage application pursuant to 35 U.S.C. §371 of International Patent Application No. PCT/DE2014/200483, filed on Sep. 19, 2014, and claims priority to German Patent Application No. DE 10 2014 201 021.7 of Jan. 21, 2014 and German Patent Application No. DE 10 2013 220 152.4 of Oct. 4, 2013, which applications are incorporated by reference in their entireties.

DESCRIPTION

Field of the Invention

The invention relates to a method for controlling a drivetrain having an internal combustion engine controlled dependent on a load demand on a target engine torque and having a dual-clutch transmission with two sub-transmissions, each having a friction clutch positioned operatively between the internal combustion engine and a sub-transmission with a changing maximum transferable clutch torque, wherein a specified clutch torque is set along an actuation travel path by means of a clutch actuator, a clutch characteristic of the transferable clutch torque is continuously adapted over the actuation travel path, and a maximum engine torque for a sub-transmission, which is reduced in comparison to the target engine torque, is limited to the maximum clutch torque transferable by means of the friction clutch of this sub-transmission.

Background of the Invention

A drivetrain of this species, having an internal combustion engine designed as a drive unit and a dual-clutch transmission having two sub-transmissions and friction clutches assigned to them, is known, for example, from DE 10 2005 036 894 A1. In such drivetrains, the target engine torque desired by the driver is transferred by means of an active sub-transmission when a gear is engaged there and the friction clutch is engaged. The friction clutch, in this case, is designed so that the target engine torque of the internal combustion engine can be transferred. In the other sub-transmission, with the friction clutch disengaged, a next gear is engaged. If shifting is to be uninterrupted in the dual-clutch transmission, the friction clutch of the active sub-transmission is disengaged and the friction clutch of the inactive sub-transmission is simultaneously engaged, so that the inactive sub-transmission now becomes the active sub-transmission. The friction clutches here are each actuated by a clutch actuator, for example a lever actuator known from DE 10 2004 009 832 A1. In this case, the actuation of the friction clutches occurs by means of a cross member or roller unit moved along a roller path by an electric motor, where a lever, spring-constrained on one side, moves an actuating device axially along an actuation travel path of the friction clutch. A clutch torque to be transferred is assigned in each case to the roller path or actuation travel by means of a clutch characteristic curve known for example from DE 10 2012 204 929 A1. The real clutch characteristic, which is known constantly, for example, by means of the characteristic curve adaptations from WO 2007/124 710 A1, is adapted on the basis of short-term temperature-dependent and long-term fluctuations in the friction coefficient of the frictional areas of the friction clutch, such as friction lining surfaces and friction surfaces of the counter-pressure plate and clamping plate. Because of high loads and damage to the friction clutches, the maximum clutch torque transferable by means of the friction clutch may be reduced so far that the desired target engine torque can no longer be transferred. So as to avoid additional damage to the friction clutch and to prevent an increase in engine speed at engine torques which exceed the maximum transferable clutch torque, it is known, for example, from the documents DE 10 2010 052 382 A1 and DE 2012 207 825 A1 to limit the engine torque to the maximum transferable clutch torque. In this case, the maximum transferable clutch torque is ascertained, and the target engine torque is limited by means of an engine intervention through the engine controller. Because of an error-prone estimation of the clutch torque and imprecisions in the setting of the target engine torque, the target engine torque may be limited excessively and thereby lead to unnecessary power losses in the drivetrain.

DESCRIPTION OF THE INVENTION

The object of the invention is to propose a method by which a drivetrain can be operated without excessive power losses when the transferring capacity of a friction clutch is reduced.

The proposed method serves, for example, as a routine for control software of a drivetrain in one or more control devices of the control system of a drivetrain. The drivetrain includes, in a non-complete enumeration, an internal combustion engine which is controlled depending on a load demand on target engine torque requested for example by a control of the drivetrain or by the driver, for example by means of an accelerator pedal, and a dual-clutch transmission with two sub-transmissions, each having a friction clutch positioned operatively between the internal combustion engine and a sub-transmission.

Dependent on a control of the dual-clutch transmission, the friction clutches transfer a specified clutch torque, and are actuated accordingly by clutch actuators, preferably lever actuators. The specified clutch torque is set along an actuation travel path. An increasing roller path of a lever actuator here corresponds to an increasing actuation travel, with increasing clutch torque to be transferred. It therefore involves friction clutches engaged under pressure. Each of the friction clutches is characterized by a maximum transferable clutch torque, which can change quickly, for example depending on the clutch temperature, and/or at long intervals, for example through wear, aging and/or damage. The adjusting of the friction clutches takes place on the basis of clutch characteristic curves, which assign a specified clutch torque to a specified actuation travel. The clutch characteristics are adapted continuously to the current properties of the friction clutch, for example their coefficient of friction and contact point.

If it is found that the maximum transferable clutch torque of a friction clutch of a sub-transmission is lower than the target engine torque, the target engine torque when the sub-transmission with this friction torque is active is limited to a maximum engine torque which is lower than the maximum clutch torque that is transferable by means of that friction clutch. In this case, the maximum engine torque is ascertained on the basis of the maximum clutch torque transferable by means of that friction clutch, a first correction value dependent on the actuation travel, and a second correction value dependent on the dynamic performance of the internal combustion engine. By using the correction values, the maximum engine torque can be increased in operating states in which it is not necessary to limit it to the maximum transferable clutch torque, and thus better performance and power delivery of the drivetrain can be achieved.

According to an advantageous embodiment, the first correction value contains a correction function which increases the maximum engine torque by a predefined value over the maximum transferable clutch torque ascertained from an estimate when roller paths of a lever actuator are small corresponding to small actuating paths of the friction clutch, and reduces this value when the actuation travel and roller path increase. It has been found advantageous here to make the value negative with maximum actuation and roller path, in order to still be able to engage the friction clutch fully when errors are present in the actuation within an error tolerance. It has also been found advantageous to replace the values of the correction function in both sub-transmissions with the minimum of the values of the correction function of the two individual sub-transmissions. The correction functions can be employed advantageously, in particular during shifting of the dual-clutch transmission between the two sub-transmissions, by overlapping actuation of the friction clutches. The correction functions can be formed from estimation, calculation or simulation, and adapted over the operating time, by taking account of or estimating relevant clutch parameters, for example coefficient of friction of the friction clutch, material changes, properties of the electric motor of the lever actuator and the like.

The second correction value takes account of the necessary eigenmoment for the operation of the internal combustion engine, in particular during acceleration. In a preferred embodiment, the maximum engine torque is increased depending on a moment of inertia of the internal combustion engine, vehicle acceleration and a gear ratio of a gear engaged in the sub-transmission. It is taken into account here, that to accelerate the internal combustion engine during acceleration of the vehicle, a high eigenmoment is necessary through the angular acceleration of the inertial mass of the crankshaft and possibly additional components of the internal combustion engine, for example the generator, air conditioner compressor and the like. This eigenmoment is added to the maximum engine torque resulting from the maximum transferable clutch torque. Advantageously, the values of the moment of inertia, the vehicle acceleration and the gear ratio are interconnected multiplicatively. The second correction value can be standardized to a specified portion of the maximum engine torque, for example 25%.

In other words, the friction clutches are supported by the target engine torque when determining the maximum engine torque. The engine torque usually has an error of, for example, at least ±10 Nm or 10% of the engine torque. At low engine torques, this leads to a very large relative error when estimating the maximum clutch torque during an adaptation of the clutch characteristic, which is carried out at lower engine torques. In this estimation procedure there is no limitation of the engine torque. At high roller paths of the lever actuator, i.e., in the range of the maximum transferable clutch torque, the estimation of the clutch torque is very much better and less subject to error, so that only the adaptation error needs to be corrected. These boundary conditions can be compensated for in the equation (1) stated below, in the first correction value. The second correction value compensates for the dynamics of the internal combustion engine:

$$TrqEngMax = TrqClMax + TrqOff + TrqDyn \quad (1)$$

Here TrqEngMax designates the maximum engine torque limited by the reduced maximum clutch torque transferable via a friction clutch, TrqClMax the maximum clutch torque transferable via the friction clutch, TrqOff the first correction value and TrqDyn the second correction value. For the second correction value TrqDyn is shown by equation (2) below:

$$TrqDyn = JEng \cdot AccVeh \cdot RatioGear \quad (2)$$

In lower gears, the second correction value may be for example 25% of the torque. The maximum clutch torque TrqClMax transferable via the friction clutch corresponds to the estimated torque from the adaptation of the clutch characteristic. The first correction value is an offset TrqOff of a lever actuator, dependent on the roller path, which below the contact point corrects the error at low torques, for example circa 50 Nm, and beginning at a specified and specifiable threshold, for example in the range of the contact point or slightly before reaching the contact point up to the maximum roller path, for example circa 35 mm, drops to an accepted error of approximately −15 Nm, The negative value is chosen in order to ensure that the friction clutch engages when there is an error.

When considering both friction clutches of a dual clutch, the first correction value according to equation (3) for the minimum of the two estimates of the clutch characteristics can be used.

$$TrqOff = MIN(TrqOff1, TrqOff2) \quad (3)$$

By this means, a continuous behavior of the engine torque is obtained, even during shifting between the sub-transmissions.

The first correction value is used by preference even when shifting between the sub-transmissions to determine the engine torque intervention during the rotational speed adaptation, so that the shifting can be carried out in efficient shifting times.

According to a preferred embodiment, the requested target engine torque can be transferred despite a reduced maximum transferable clutch torque of a friction clutch of an active sub-transmission. To this end, via a first, active sub-transmission, with target engine torque limited to the maximum engine torque, a differential torque between target engine torque and maximum engine torque is transferred by means of the second sub-transmission, by engaging a higher gear than the gear engaged in the first sub-transmission and with the friction clutch operated with slip. This means that the maximum clutch torque transferable via the friction clutch of the active sub-transmission is ascertained on the basis of equation (1). The maximum transferable clutch torque is transferred via this friction clutch. The differential torque from target engine torque and maximum engine torque is transferred via the inactive sub-transmission, by shifting to a next higher gear in this sub-transmission and engaging the friction clutch far enough so that the differential torque is transferred.

During this process, the friction clutch of the inactive sub-transmission is operated with slip. In order to protect this friction clutch against overloading, torque transfer via the inactive second sub-transmission is limited to a specified energy input into the friction clutch of the second sub-transmission. If the specified energy contribution is exceeded, the friction clutch is at least partially disengaged. Based on a predicted load on the friction clutch, for example when pulling a trailer, on uphill grades and/or the like, right from the beginning a lower torque than the differential torque can be transferred, in order to be able to prolong the service life of the friction clutch at the specified energy input. Furthermore, the clutch torque transferred via the friction clutch can be adjusted up to as high as the differential torque, depending on the clutch temperature.

According to a preferred embodiment of the proposed method, during shifting between the sub-transmissions having a friction clutch with reduced maximum transferable clutch torque, the differential torque that exists between target engine torque and maximum engine torque can be transferred via the other sub-transmission when a gear is engaged, by engaging the other friction clutch early or delaying disengaging it. This means that over speeding of the internal combustion engine is brought under control by a lower clutch torque transferable via a friction clutch, by applying the other friction clutch.

In other words, the need to limit the torque of the internal combustion engine preferably occurs during constant travel of a motor vehicle with the pertinent drivetrain under heavy load and/or on uphill grades. In a driving situation of this sort, in addition to operating the sub-transmission having a friction clutch with reduced maximum clutch torque, in the inactive sub-transmission the next-higher gear may be pre-engaged and the friction clutch of this sub-transmission and the friction clutch of this sub-transmission engaged, in order not to have to limit the target engine torque. This strategy is preferably limited based on the energy input, so as not to overheat the clutch. In this case, the friction clutch may be operated successively at the maximum engine torque, without the driver experiencing reduced performance, overspending of the internal combustion engine (flaring) or reduced comfort.

The strategy of taking over missing clutch torques of the friction clutch of the active sub-transmission by engaging the friction clutch of the other sub-transmission can also be employed during shifting between the sub-transmissions. When upshifting under traction, it is possible to preselect the next higher gear of the inactive sub-transmission after or during the adaptation of rotational speed. Ideally, this gear is already engaged during the adaptation of rotational speed, so that the engine torque does not have to be cut.

When downshifting, it is not necessary to preselect a lower gear of the inactive sub-transmission, since it is preferably already engaged. Over speeding of the internal combustion engine can be prevented directly here, by not fully disengaging the friction clutch that is being disengaged. The difference between target engine torque and maximum engine torque, and thus of the maximum clutch torque of the friction clutch being engaged, is compensated for by the friction clutch being disengaged.

BRIEF DESCRIPTION OF THE DRAWINGS

The invention will be explained in further detail on the basis of the diagrams in FIGS. 1 through 5.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices and materials are now described.

Figure 1:
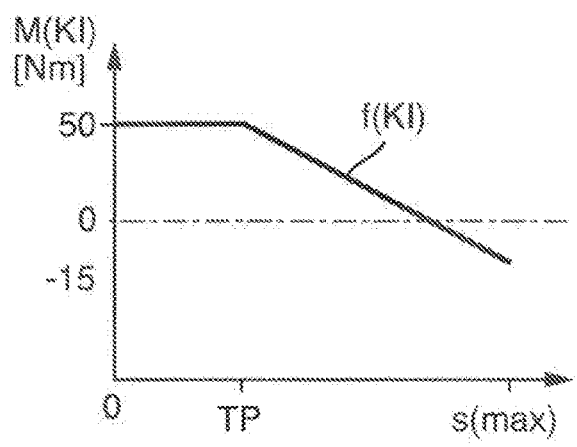
FIG. 1 is a diagram to depict the correction function of a first correction value.

The diagram of FIG. 1 shows the correction function f(C1) of the first correction value TrqOff in equation (1) listed above. The first correction value over the actuation travel s or of a roller path of a lever actuator correlating therewith to actuate a friction clutch, corresponding to a correction torque T(C1), sets a high correction torque T(C1) of 50 Nm, for example, with small actuation travels s and thus small clutch travels. Starting at the contact point TP of the friction clutch, this correction torque is reduced as the actuation travels s increase, and is negative at the maximum actuation travel s, amounting, for example, to −15 Nm. This means that the maximum engine torque is reduced so far compared to an estimate of the maximum clutch torque transferable via the friction clutch, so that the friction clutch can in any case be engaged and does not slip more than an intended amount. "Maximum engine torque" is understood here to mean an engine torque lower than the target engine torque which is transferable via the friction clutch having reduced transferring capacity.

Figure 2:
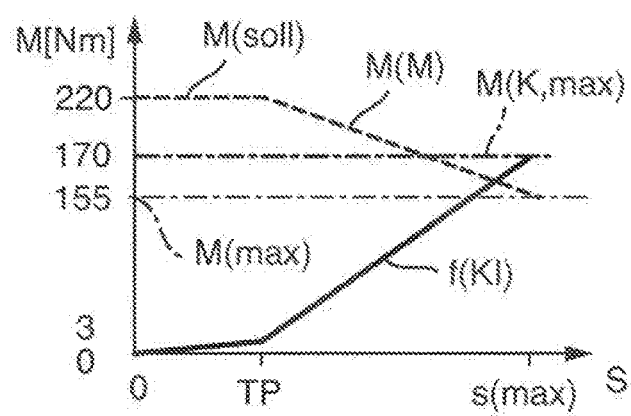
FIG. 2 is a diagram containing a depiction of the development of a maximum engine torque over the actuation travel of the friction clutch.

The diagram in FIG. 2 shows the development of the engine torque T(E) over the actuation travel s at a maximum clutch torque T(C,max) transferable via the friction clutch, for example 170 Nm, which is lower than the target engine torque, in this case 220 Nm. On the basis of the correction function f(C1) of the first correction value, the engine torque T(E) is reduced starting from the contact point TP up to the maximum actuation travel s(max), and at the maximum actuation travel s(max) is below the maximum transferable clutch torque T(C,max), for example at 155 Nm, so as to be able to engage the friction clutch reliably within the permissible error tolerance.

Figure 3:
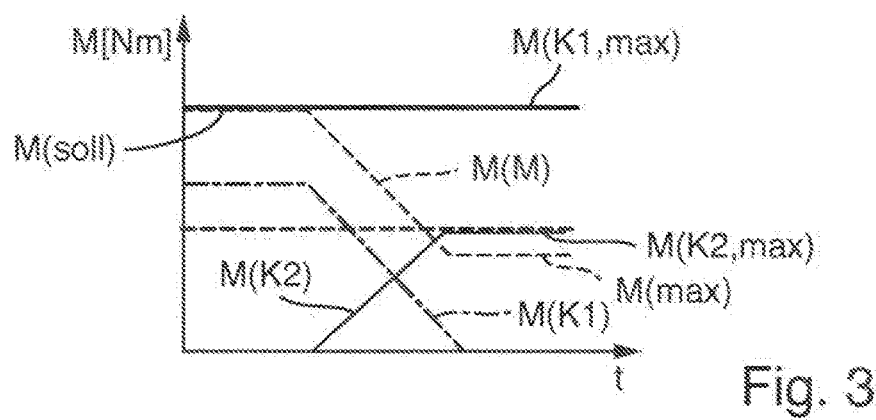
FIG. 3 is a diagram of a shift between two sub-transmissions of a dual-clutch transmission.

The diagram in FIG. 3 shows a shifting process between both sub-transmissions of a dual-clutch transmission on the basis of the torques T present over the time t. The maximum clutch torque T(C2,max) of the inactive sub-transmission transferable via the friction clutch is reduced here compared to the maximum clutch torque T(C1,max) transferable via the other friction clutch. During the shifting the two clutches are operated overlappingly; that is, the clutch torque T(C1) of the friction clutch of the active sub-transmission is reduced, while the clutch torque T(C2) of the friction clutch of the (still) inactive sub-transmission is increased, so that the engine torque T(E) is redirected during the shift from the active sub-transmission to the inactive, then activated, sub-transmission. Because of the reduced transferring capacity of the friction clutch of the inactive sub-transmission, during the shift, a torque intervention in the engine torque T(E) occurs corresponding to FIG. 2, so that the target engine torque T(target) is limited to the maximum engine torque T(max) below the maximum transferable clutch torque T(C2,max).

Figure 4:
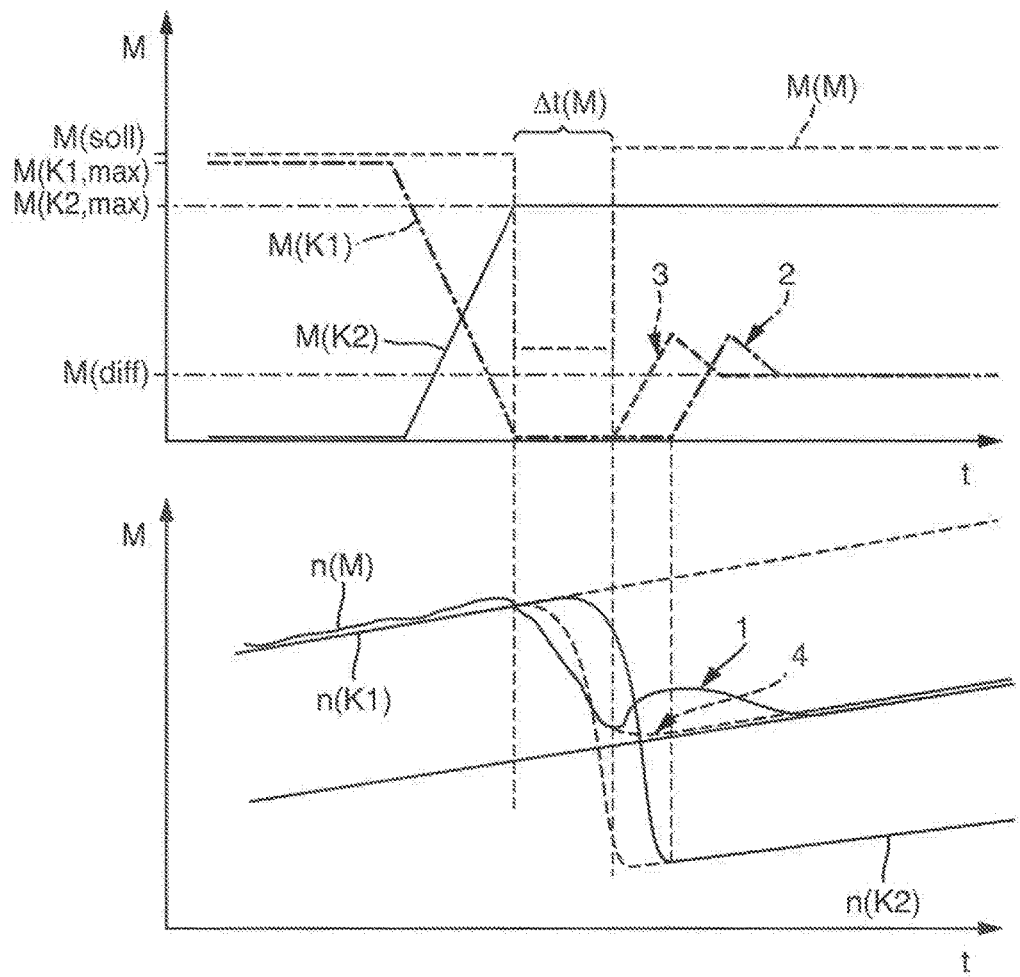
FIG. 4 is a shift diagram of a traction upshift between two sub-transmissions of a dual-clutch transmission.

The diagram in FIG. 4 shows a traction upshift between two sub-transmissions of a dual-clutch transmission over the time t. The upper part of the diagram shows the torque patterns over the time t with the engine torque T(E), the clutch torque T(C1) of the active sub-transmission with unimpaired friction clutch with the maximum transferable clutch torque T(C1,max) of the sub-torque active before the shift and the clutch torque T(C2) of the inactive sub-transmission with reduced maximum transferable clutch torque T(C2,max). The lower part shows the rotational speed patterns over the time t with the speed n(E) of the engine, the speed n(C1) of the transmission input shaft of the active sub-transmission and the speed n(C2) of the transmission input shaft of the inactive sub-transmission. In contrast to the shift depicted in FIG. 3, except for the torque intervention during the time interval Δt(M) no reduction of the engine torque T(E) occurs. This means that when the sub-transmission with the friction clutch having reduced maximum transferable clutch torque T(C2,max) is active after the shift, the differential torque T(diff) missing from this friction clutch occurs by engaging the friction clutch of the sub-transmission which is inactive after the shift, with the next-higher gear engaged. In this way, the entire engine torque T(target) can be transferred via the dual-clutch transmission. In order to reduce the over speeding of the rotational speed n(E) of the internal combustion engine (flaring) in the area of the arrow 1 due to the reduced transfer capacity of the friction clutch, after the next gear is engaged in the now inactive sub-transmission, the friction clutch is engaged beyond the differential torque T(diff) (arrow 2). If the gear to be engaged is already engaged, in accordance with arrow 3 the clutch torque T(C1) can be engaged earlier, corresponding to the dashed line, and overspending of the speed n(E) of the internal combustion engine can be completely avoided, corresponding to the dashed line in the area of arrow 4.

Figure 5:
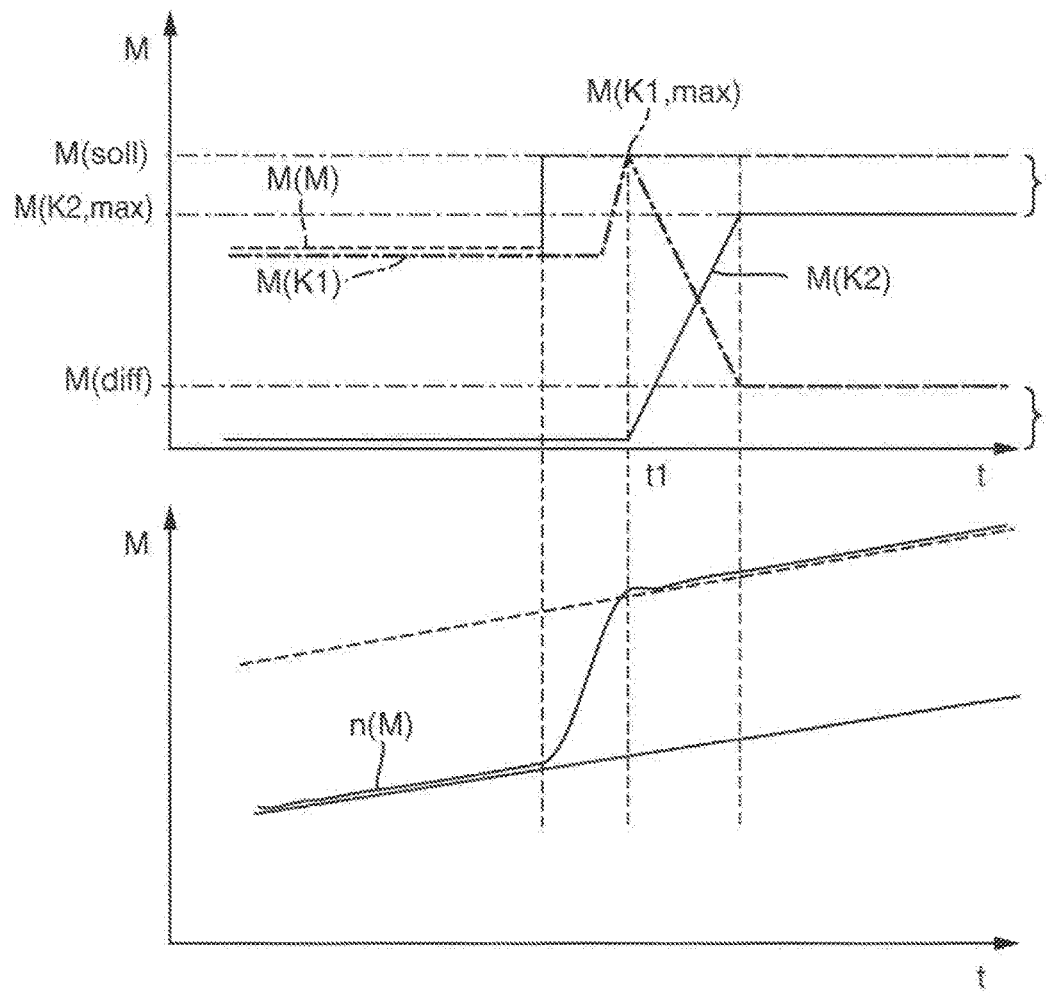
FIG. 5 is a shift diagram of a traction downshift between two sub-transmissions of a dual-clutch transmission.

In the depiction corresponding to FIG. 4, FIG. 5 shows a downshift between two sub-transmissions of a dual-clutch transmission over the time t. Here, due to the driving situation prior to the shift, the engine torque T(E) and the clutch torque T(C1) are set below the maximum transferable clutch torque T(C1,max) of the unimpaired friction clutch. Due to the request for a downshift, the next-lower gear is already engaged in the inactive sub-transmission. While downshifting, the engine torque T(E) is increased to the target engine torque T(target) during the shift. In order to avoid over speeding of the rotational speed n(E) of the internal combustion when shifting to the sub-transmission having the friction clutch with the clutch torque T(C2) and the reduced maximum transferable clutch torque T(C2,max) during the shifting, the clutch torque T(C1) is briefly increased at time point t1 to the maximum transferable clutch torque T(C1,max) and then lowered to the differential torque T(diff), so that viewed across both sub-transmissions, despite the reduced transfer capacity of the friction clutch having reduced maximum transferable clutch torque T(C2,max), the entire target engine torque T(target) can be transferred in the higher gear with the friction clutch of the now inactive sub-transmission engaged with the differential torque T(diff).

LIST OF REFERENCE SYMBOLS f(CI) correction function
M torque
T(diff) differential torque
T(C) clutch torque
T(C1) clutch torque
T(C2) clutch torque
T(CI) correction torque
T(C,max) maximum clutch torque transferable via the friction clutch
T(C1,max) maximum clutch torque transferable via the friction clutch
T(C2,max) maximum clutch torque transferable via the friction clutch
T(E) engine torque
T(max) maximum engine torque
T(target) target engine torque
n(E) rotational speed of combustion engine
n(C1) rotational speed of transmission input shaft of sub-transmission
n(C2) rotational speed of transmission input shaft of sub-transmission
s actuation travel
s(max) maximum actuation travel
TP contact point
t time
t1 point in time
Δt(T) time interval
1 arrow
2 arrow
3 arrow
4 arrow

What is claimed is:

1. A method for controlling a drivetrain, comprising: an internal combustion engine dependent on a load demand on a target engine torque and having a dual-clutch transmission with two sub-transmissions, each having a friction clutch positioned operatively between the internal combustion engine and a sub-transmission with a changing maximum transferable torque, wherein a specified clutch torque is set along an actuation travel path by means of a clutch actuator, wherein a clutch characteristic of the transferable clutch torque is continuously adapted over the actuation travel path, wherein a maximum engine torque for a sub-transmission, which is reduced in comparison to the target engine torque, is limited to the maximum clutch torque transferable by means of the friction clutch of that sub-transmission, wherein the maximum engine torque is ascertained on the basis of the adapted maximum clutch torque, transferable via the friction clutch, of a first correction value dependent on the actuation travel, and of a second correction value dependent on the dynamic behavior of the internal combustion engine.

2. The method for controlling a drivetrain as in claim 1, wherein the first correction value by means of a correction function increases the maximum engine torque over the maximum transferable clutch torque, by a specified value when actuation travel is small, and reduces this value when the actuation travel increases.

3. The method for controlling a drivetrain as recited in claim 2, wherein the value is negative at maximum actuation travel.

4. The method for controlling a drivetrain as recited in claim 3, wherein for both sub-transmissions the values of the correction function are set from the minimum of the values of the correction functions of the two individual sub-transmissions.

5. The method for controlling a drivetrain as recited in claim 4, wherein the second correction value increases the maximum engine torque depending on a moment of inertia of the internal combustion engine, a vehicle acceleration and a gear ratio of a gear selected in the sub-transmission.

6. The method for controlling a drivetrain as recited in claim 5, wherein the values of the moment of inertia, the vehicle acceleration, and the gear ratio are interconnected multiplicatively.

7. The method for controlling a drivetrain as recited in claim 6, wherein the second correction value is standardized to a specified portion of the maximum engine torque.

8. The method for controlling a drivetrain as recited in claim 7, wherein via a first sub-transmission, with target engine torque limited to the maximum engine torque, a differential torque between target engine torque and maximum engine torque is transferred by means of the second sub-transmission, by engaging a higher gear than the gear engaged in the first sub-transmission and with the friction clutch operated with slip.

9. The method for controlling a drivetrain as recited in claim 8, wherein torque transfer via the second sub-transmission is limited to a specified energy input into the friction clutch of the second sub-transmission.

10. The method for controlling a drivetrain as recited in claim 9, wherein during shifting between the sub-transmissions with reduced maximum transferable clutch torque, the differential torque that exists between target engine torque and maximum engine torque can be transferred via the other sub-transmission when a gear is engaged, by engaging the other friction clutch early or delaying engaging it.

\* \* \* \* \*